United States Patent [19]

Hong et al.

[11] Patent Number: 5,668,070
[45] Date of Patent: Sep. 16, 1997

[54] CERAMIC COMPOSITION FOR ABSORBING ELECTROMAGNETIC WAVE AND A METHOD FOR MANUFACTURING THE SAME

[76] Inventors: Sung-Yong Hong, 210-702, Hanbomido Apartment, 511 Daechi-Dong, Kangnam-Ku, Seoul; Chang-Ho Ra, 152-18, Shimgok-2-Dong, Wonmi-Ku, Buchon-Shi, Kyeongki-Do, both of Rep. of Korea

[21] Appl. No.: 735,794

[22] Filed: Oct. 21, 1996

[51] Int. Cl.$^6$ ........................ C04B 35/26
[52] U.S. Cl. ........................ 501/126; 342/1
[58] Field of Search ................ 501/126; 342/1

[56] References Cited

U.S. PATENT DOCUMENTS

| | | | |
|---|---|---|---|
| 4,960,642 | 10/1990 | Kosuga et al. | 428/407 |
| 5,441,746 | 8/1995 | Chagnon | 424/450 |
| 5,446,459 | 8/1995 | Kim et al. | 342/1 |

FOREIGN PATENT DOCUMENTS 96-40960  9/1996  Rep. of Korea .

*Primary Examiner*—Karl Group
*Attorney, Agent, or Firm*—Ostrolenk, Faber, Gerb & Soffen, LLP

[57] ABSTRACT

A ceramic composition for absorbing electromagnetic waves and a method for manufacturing the same are disclosed. The composition comprises a raw powder comprising by weight between about 35% to 65% $Fe_2O_3$, between about 1% to 5% $Al_2O_3$, between about 0.5% to 1.5% Zn, between about 0.5% to 1.0% Cr, between about 3% to 10% Cu, between about 3% to 8% Mn, and between about 1% to 4% Co, and a mixture around the raw powder comprising by weight between 30% to 40% water, between 1.5% to 2.0% a dispersing, and between 1.5% to 2% a plasticizer. The method comprises the steps of grinding the powder, spray drying the grounded powder, forming the sprayed powder into a predetermined shape, calcinating and sintering the shape in a furnace, and cooling the sintered shape gradually. The ceramic composition absorbs the electromagnetic waves generated from electric devices such as cellular phones, beepers, computers, cordless telephones, etc. by attaching the ceramic composition at a predetermined position on the electric devices.

11 Claims, No Drawings

CERAMIC COMPOSITION FOR ABSORBING ELECTROMAGNETIC WAVE AND A METHOD FOR MANUFACTURING THE SAME

BACKGROUND OF THE INVENTION

1. Field of the Invention

The present invention relates to a ceramic composition and a method for manufacturing the same, and more particularly to a ceramic composition for absorbing electromagnetic wave generated from electric devices such as a cellular phone, a beeper, a computer, a cordless telephone etc., and a method for manufacturing the same.

2. Description of the Prior Art

Generally, fine ceramics or new ceramics are different from conventional ceramics in their composition and their manufacturing method such as forming and sintering. That is, fine ceramics are manufactured by a forming method and a sintering method which exactly control a precisely prepared composition by using an artificial raw powder or a highly purified raw powder. Thus, fine ceramics have a greater number of applications than conventional ceramics. Fine ceramics are used for various purposes because various applications of fine ceramics have recently been discovered.

Fine ceramics are generally classified into oxide type ceramics and non-oxide type ceramics. An oxide type ceramic includes alumina ($Al_2O_3$), ferrite ($Fe_2O_3$), zirconia ($ZrO_2$), and titania ($TiO_2$) etc. A non-oxide type ceramic includes silicon carbide (SiC), and silicon nitride ($Si_3N_4$) and so on. At present, new applications for fine ceramics such as thermal applications, mechanical applications, biochemical applications, electric applications, electronic applications, and optic applications are being discovered, and the research concerning these applications will be continued.

At present, many electric devices such as cellular phones, beepers, computers, cordless telephones, televisions etc., are utilized during daily life. It is necessary to use these electric devices in modern daily life, but most of these devices radiate electromagnetic waves. It is well known to everybody that the electromagnetic waves generated from these electric devices are harmful to people who use these electric devices. Therefore, it is continued that the research for shielding the harmful electromagnetic waves generated from these electric devices. Such pellets for making electromagnetic wave shielding material are disclosed in U.S. Pat. No. 4,960,642 (issued to Izumi Kosuga et. al). The pellets can shield electromagnetic wave by inserting conductive fibers into a matrix resin. Also, it is disclosed that a method for absorbing electromagnetic waves generated from electric devices by means of installing a ferrite core into these electric devices.

However, above-described pellets and method can't block enough of the electromagnetic waves generated from these electric devices, and the manufacturing method and the structure of these devices are complicated because the pellets and the magnetic core are inserted on the circuit board of the electromagnetic devices.

SUMMARY OF THE INVENTION

Considering the above-mentioned problems, it is a first object of the present invention to provide a ceramic composition for absorbing electromagnetic waves generated from electric devices by attaching the composition at a predetermined position on the electric devices.

It is a second object of the present invention to provide a method for manufacturing a ceramic composition for absorbing electromagnetic waves, which is specially suitable for manufacturing the ceramic composition.

To achieve the above objects, the ceramic composition for absorbing electromagnetic waves according to the present invention, comprises:

a raw powder comprising by weight between about 35% and about 65% $Fe_2O_3$, between about 1% and about 5% $Al_2O_3$, between about 0.5% and about 1.5% Zn, between about 0.5% and about 1.0% Cr, between about 3% and about 10% Cu, between about 3% and about 8% Mn, and between about 1% and about 4% Co; and a mixture around the raw powder comprising by weight between about 30% and about 45% water, between about 1.5% and about 2.0% a dispersing agent, and between about 1.5% and about 2.0% a plasticizer.

Preferably, the raw powder comprises by weight between about 40% and about 50% $Fe_2O_3$, and more preferably, the raw powder comprises by weight about 45% $Fe_2O_3$.

In the case that the raw powder comprises by weight between about 40% and about 50% $Fe_2O_3$, the rates of absorption of the electric field and the magnetic field generated by electric devices, are between 36.6% and 54.3%. Particularly, in the case that the raw powder comprises by weight about 45% by $Fe_2O_3$, the rate of absorption of the electric field has a maximum value of 41.2% and the rate of absorption of the magnetic field has a maximum value of 52.8% when the rates are measured by Holaday HI-4000 RF Hazard Measurement System. When the raw powder comprises by weight below about 35% $Fe_2O_3$, the rates of absorption of the electric field and the magnetic field become below 30% because the forming density of the raw powder is lowered. Also, when the raw powder comprises by weight above about 65% $Fe_2O_3$, the rates of absorption of the electric field and the magnetic field become below 30% because grinding the raw powder and adjusting the grain size of the raw powder may be difficult, so the grain size of the raw powder grows excessively during sintering the raw powder.

The dispersing agent comprises at least one substance selected from the group consisting of hexamethanol, polyvinylalcohol, and polyethylen. And, the plasticizer comprises at least one substance selected from the group consisting of gelatin, dextrin, and cellulose.

Also, to achieve the above objects, the method for manufacturing the ceramic composition for absorbing electromagnetic waves according to the present invention, comprises;

i) homogeneously mixing a raw powder comprising by weight between about 35% and about 65% $Fe_2O_3$, between about 1% and about 5% $Al_2O_3$, between about 0.5% and about 1.5% Zn, between about 0.5% and about 1.0% Cr, between about 3% and about 10% Cu, between about 3% and about 8% Mn, and between about 1% and about 4% Co, and a mixture around the raw powder comprising by weight between about 30% and about 45% water, between about 1.5% and about 2.0% a dispersing agent, and between about 1.5% and about 2.0% a plasticizer;

ii) grinding the mixed powder;

iii) converting the grounded powder into granulates;

iv) forming the granulates into a shaped body;

v) calcinating the shaped body, and sintering the shaped body to form a sintered body; and vi) cooling the sintered body gradually.

The step ii) is a wet grinding method using a ball mill for 45 hours to 50 hours in order to make the mixed powder having a particle distribution of between about 1 μm and about 3 μm, and the step iii) is a spray drying method.

Preferably, the step iv) is forming the granulates by using a metal pressing means at a pressure of between 800 kg/cm² and 1200 kg/cm², to form a cylindrical shaped body having a hole through therein. When the cylindrical shaped body is formed, the shaped body cannot be formed below a pressure of 800 kg/cm², the granulates are excessively dense above a pressure of 1200 kg/cm², so grains of the granulates grow excessively during sintering the shaped body.

Preferably, step v) is calcinating the shaped body in a furnace for 10 hours to 12 hours in a nitrogen atmosphere, and then sintering the calcinated body in the furnace with a temperature between 1300° C. and 1500° C. for 1.5 hours to 2.5 hours. When the sintering time is between 1.5 hours and 2.5 hours, and the sintering temperature is 1400° C., the sintered body having the most preferable shape and grain size can be obtained.

Therefore, the ceramic composition according to the present invention can absorb the electromagnetic waves generated from electric devices such as cellular phones, beepers, computers, cordless telephones, televisions, etc. by attaching the composition at predetermined position on the devices.

The above objects and other advantages of the present invention will become more apparent by describing in detail the preferred embodiments thereof.

DETAILED DESCRIPTION OF THE PREFERRED EMBODIMENTS

Example 1 a raw powder comprising by weight about 60% $Fe_2O_3$, about 5% $Al_2O_3$, about 1% Zn, about 8% Cu, about 3% Mn, and about 2% Co, and a mixture around the raw powder comprising by weight about 40% water, about 1.5% dispersing agent consisting of hexamethanol and polyvinylalcohol, and about 2.0% gelatin as a plasticizer, are homogeneously mixed. The $Fe_2O_3$ is a powder manufactured by Kyocera Co., and the $Al_2O_3$ is a powder manufactured by Sumitomo Co. The hexamethanol, the polyvinylalcohol, and the gelatin are produced by Sannop Co.

Subsequently, the mixed powder is grounded by using a wet grinding method in a ball mill for 45 hours to 50 hours, preferably 48 hours, to have a particle distribution of 1 μm to 3 μm. And then, the powder is converted into granulates by spray drying through a sieve having 120 meshs/inch.

The granulates are pressed by using a metal press at the pressure of 1000 kg/cm² at room temperature, to form a cylindrical shaped body having a hole through therein. In this case, the density of the shaped body is 2.8 g/cm³. Successively, the shaped body is calcinated in a furnace for 12 hours in a nitrogen atmosphere, and is sintered in the furnace for 2 hours at 1400° C. Then, the furnace is gradually cooled, so that a ceramic composition having the cylindrical shaped body is produced.

The rates of absorption of the electric field and the magnetic field generated by a cellular phone produced by LG Electronics Co., are shown in Table 1. The generated electric fields, the generated magnetic fields and the rates of absorption shown in Table 1 are measured at an interval of 5 cm from the cellular phone by using Holaday HI-400 RF Measurement System.

TABLE 1

|  | Not attaching the ceramic composition | Attaching the ceramic composition | Rate of absorption (%) |
|---|---|---|---|
| Electric Field (V/m) | 29.2 | 18.5 | 36.6 |
| Magnetic Field (mG) | 4.69 | 2.74 | 41.6 |

Referring to Table 1, after the ceramic composition is attached to the cellular phone, the electric field is 18.5 V/m and the magnetic field is 2.74 mG. When the ceramic composition is not attached to the cellular phone, the electric field is 29.2 V/m and the magnetic field is 4.69 mG. Therefore the rates of absorption of the electric field and the magnetic field by the ceramic composition are respectively 36.6% and 41.6%.

Table 2 shows the rate of absorption electric field generated from a cellular phone produced by Samsung Electronics Co. The electric field and the rate shown in Table 2 are measured at an interval of 2 cm from the cellular phone by using 8700 Survey System produced by Narda, America.

TABLE 2

|  | Not attaching the ceramic composition | Attaching the ceramic composition | Rate of absorption (%) |
|---|---|---|---|
| Electric Field (V/m) | 22.4 | 11.1 | 50.4 |

Referring to Table 2, after the ceramic composition is attached to the cellular phone, the electric field is 11.1 V/m. When the ceramic composition is not attached to the cellular phone, the electric field is 29.2 V/m. Therefore the rate of absorption electric field by the ceramic composition is 50.4%.

Therefore, as shown in Table 1 and Table 2, the ceramic composition according to example 1 can absorb much of the electric field and the magnetic field which are generated by electric devices.

Example 2 a raw powder comprising by weight about 50% $Fe_2O_3$, about 3% $Al_2O_3$, about 1% Zn, about 5% Cu, about 5% Mn, and about 2% Co, and a mixture around the raw powder comprising by weight about 40% water, about 1.5% a dispersing agent consisting of hexamethanol and polyvinylalcohol, and about 2.0% gelatin as a plasticizer, are homogeneously mixed.

Subsequently, the mixed powder is grounded by using a wet grinding method in a ball mill for 45 hours to 50 hours, preferably 48 hours to have a particle distribution of 1 μm to 3 μm. Then, the powder is converted into granulates by spray drying through a sieve having 120 meshs/inch.

The granulates are pressed by using a metal press at a pressure of 1000 kg/cm² at room temperature, to form a cylindrical shaped body having a hole through therein. In this case, the density of shaped body is 2.8 g/cm³. Successively, the shaped body is calcinated in a furnace for 12 hours in a nitrogen atmosphere, and sintered in the furnace for 2 hours at 1400° C. And then, the furnace is gradually cooled, so a ceramics composition having the cylindrical shaped body is produced.

The rates of absorption the electric field and the magnetic field generated by a cellular phone produced by LG Electronics Co., are shown in Table 3. The generated electric fields, the generated magnetic fields and the rates shown in Table 3 are measured at an interval of 5 cm from the cellular phone by using Holaday HI-400 RF Measurement System.

TABLE 3

|  | Not attaching the ceramic composition | Attaching the ceramic composition | Rate of absorption (%) |
| --- | --- | --- | --- |
| Electric Field (V/m) | 28.3 | 17.5 | 38.2 |
| Magnetic Field (mG) | 4.72 | 2.76 | 41.5 |

Referring to Table 3, after the ceramic composition is attached to the cellular phone, the electric field is 17.5 V/m and the magnetic field is 2.76 mG. When the ceramic composition is not attached to the cellular phone, the electric field is 28.3 V/m and the magnetic field is 4.72 mG. Therefore, the rates of absorption of the electric field and the magnetic field by the ceramic composition are respectively 38.2% and 41.5%.

Table 4 shows the rate of absorption of the electric field generated by a cellular phone produced by Samsung Electronics Co. The electric fields and the rate shown in Table 4 are measured at an interval of 2 cm from the cellular phone by using 8700 Survey System produced by Narda.

TABLE 4

|  | Not attaching the ceramic composition | Attaching the ceramic composition | Rate of absorption (%) |
| --- | --- | --- | --- |
| Electric Field (V/m) | 24.7 | 11.3 | 54.3 |

Referring to Table 4, after the ceramic composition is attached to the cellular phone, the electric field is 11.3 V/m. When the ceramic composition is not attached to the cellular phone, the electric field is 24.7 V/m. Therefore, the rate of absorption of the electric field by the ceramic composition is 54.3%.

Therefore, as shown in Table 3 and Table 4, the ceramic composition according to example 2 can absorb much of the electric field and the magnetic field which are generated by electric devices.

Example 3 a raw powder comprising by weight about 45% $Fe_2O_3$, about 3% $Al_2O_3$, about 0.5% Zn, about 3% Cu, about 8% Mn, and about 3% Co, and a mixture around the raw powder comprising by weight about 40% water, about 1.5% a dispersing agent consisting of hexamethanol and polyvinylalcohol, and about 2.0% gelatin as a plasticizer, are homogeneously mixed.

Subsequently, the mixed powder is grounded by using a wet grinding method in a ball mill for 45 hours to 50 hours, preferably 48 hours to have a particle distribution of 1 μm to 3 μm. And then, the powder is converted into granulates by spray drying through a sieve having 120 meshs/inch.

The granulates are pressed by using a metal press at a pressure of 1000 kg/cm² at room temperature, to form a cylindrical shaped body having a hole through therein. In this case, the density of shaped body is 2.8 g/cm³. Successively, the shaped body is calcinated in a furnace for 12 hours in a nitrogen atmosphere, and sintered in the furnace for 2 hours at 1400° C. Then, the furnace is gradually cooled, so a ceramics composition having the cylindrical shaped body is produced.

The rates of absorption of the electric field and the magnetic field generated by a cellular phone produced by LG Electronics Co., are shown in Table 5. The electric fields, the magnetic fields and the rates shown in Table 5 are measured at an interval of 5 cm from the cellular phone by using Holaday HI-400 RF Measurement System.

TABLE 5

|  | Not attaching the ceramic composition | Attaching the ceramic composition | Rate of absorption (%) |
| --- | --- | --- | --- |
| Electric Field (V/m) | 28.4 | 16.7 | 41.2 |
| Magnetic Field (mG) | 4.75 | 2.24 | 52.8 |

Referring to Table 5, after the ceramic composition is attached to the cellular phone, the electric field is 16.7 V/m and the magnetic field is 2.24 mG. When the ceramic composition is not attached to the cellular phone, the electric field is 28.4 V/m and the magnetic field is 4.75 mG. Therefore the rates of absorption of the electric field and the magnetic field by the ceramic composition are respectively 41.2% and 52.8%.

Table 6 shows the rate of absorption of the electric field generated by a cellular phone produced by Samsung Electronics Co. The magnetic fields and the rate shown in Table 6 are measured at an interval of 2 cm from the cellular phone by using 8700 Survey System produced by Narda.

TABLE 6

|  | Not attaching the ceramic composition | Attaching the ceramic composition | Rate of absorption (%) |
| --- | --- | --- | --- |
| Electric Field (V/m) | 22.4 | 8.4 | 62.5 |

Referring to Table 6, after the ceramic composition is attached to the cellular phone, the electric field is 8.4 V/m. When the ceramic composition is not attached to the cellular phone, the electric field is 22.4 V/m. Therefore, the rate of absorption of the electric field by the ceramic composition is 62.5%.

Therefore, as shown in Table 5 and Table 6, the ceramic composition according to example 3 can absorb much of the electric field and the magnetic field which are generated by electric devices.

As it is described above, the ceramic composition according to the present invention can absorb much of the electric field and the magnetic field generated by electric devices. That is, the ceramic composition can absorb the electromagnetic waves generated from electric devices.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A ceramic composition for absorbing electromagnetic waves, comprising:

a raw powder comprising by weight between about 35% and about 65% $Fe_2O_3$, between about 1% and about 5% $Al_2O_3$, between about 0.5% and about 1.5% Zn, between about 0.5% and about 1.0% Cr, between about 3% and about 10% Cu, between about 3% and about 8% Mn, and between about 1% and about 4% Co; and a mixture around said raw powder comprising by weight between about 30% and about 45% water, between about 1.5% and about 2.0% a dispersing agent, and between about 1.5% and about 2.0% a plasticizer.

2. The ceramic composition for absorbing electromagnetic waves as claimed in claim 1, wherein said raw powder comprises by weight between about 40% and about 50% $Fe_2O_3$.

3. The ceramic composition for absorbing electromagnetic waves as claimed in claim 1, wherein said raw powder comprises by weight about 45% $Fe_2O_3$.

4. The ceramic composition for absorbing electromagnetic waves as claimed in claim 1, wherein said dispersing agent comprises at least one substance selected from the group consisting of hexamethanol, polyvinylalcohol, and polyethylen.

5. The ceramic composition for absorbing electromagnetic waves as claimed in claim 1, wherein said plasticizer comprises at least one substance selected from the group consisting of gelatin, dextrin, and cellulose.

6. A method for manufacturing a ceramic composition for absorbing electromagnetic waves, which comprises the steps of:

i) homogeneously mixing a raw powder comprising by weight between about 35% and about 65% $Fe_2O_3$, between about 1% and about 5% $Al_2O_3$, between about 0.5% and about 1.5% Zn, between about 0.5% and about 1.0% Cr, between about 3% and about 10% Cu, between about 3% and about 8% Mn, and between about 1% and about 4% Co, with a mixture around the raw powder comprising by weight between about 30% and about 45% water, between about 1.5% and about 2.0% a dispersing agent, and between about 1.5% and about 2.0% a plasticizer;

ii) grinding the mixed powder;

iii) converting the grounded powder into granulates;

iv) forming the granulates into a shaped body;

v) calcinating the shaped body, and sintering the shaped body to form a sintered body; and vi) cooling the sintered body gradually.

7. The method for manufacturing a ceramic composition as claimed in claim 6, wherein said step ii) is a wet grinding method using a ball mill for 45 hours to 50 hours in order to make the mixed powder having a particle distribution of between about 1 μm and about 3 μm.

8. The method for manufacturing a ceramic composition as claimed in claim 6, wherein said step iii) is a spray drying method.

9. The method for manufacturing a ceramic composition as claimed in claim 6, wherein said step iv) is forming the granulates by using a metal pressing means at a pressure of between 800 $kg/cm^2$ and 1200 $kg/cm^2$, to form a cylindrical shape having a hole through therein.

10. The method for manufacturing a ceramic composition as claimed in claim 6, wherein said step v) is calcinating the shaped body in a furnace for 10 hours to 12 hours in a nitrogen atmosphere, and then sintering the calcinated body in the furnace with a temperature between 1300° C. and 1500° C. for 1.5 hours to 2.5 hours.

11. The ceramic composition as claimed in claim 1, wherein said ceramic composition is used as a material for absorbing electromagnetic wave.

* * * * *